May 6, 1947.   H. A. MARSH   2,420,048
TRAINING DEVICE
Filed March 24, 1943   5 Sheets-Sheet 1

HAROLD A. MARSH
*INVENTOR.*

BY
ATTORNEYS.

HAROLD A. MARSH
*INVENTOR*

May 6, 1947.  H. A. MARSH  2,420,048
TRAINING DEVICE
Filed March 24, 1943  5 Sheets-Sheet 3

HAROLD A. MARSH
INVENTOR.

BY
ATTORNEYS.

May 6, 1947. H. A. MARSH 2,420,048
TRAINING DEVICE
Filed March 24, 1943 5 Sheets-Sheet 5

HAROLD A. MARSH
INVENTOR.

BY
ATTORNEYS.

Patented May 6, 1947

2,420,048

UNITED STATES PATENT OFFICE 2,420,048

TRAINING DEVICE

Harold A. Marsh, Boston, Mass., assignor to Link Aviation, Inc., Binghamton, N. Y., a corporation of New York Application March 24, 1943, Serial No. 480,330

7 Claims. (Cl. 35—10)

My invention relates to devices used in the teaching of students the art of celestial navigation and is an improvement upon the copending applications of Edwin A. Link, Serial No. 250,958, filed January 14, 1939, and Serial No. 470,344, filed December 28, 1942, the latter application now being U. S. Patent 2,364,539, dated December 5, 1944.

One of the main objects of such a training device is to provide in combination with a grounded aviation trainer or similar supporting means for a student a simulated celestial sphere together with means for rotating the simulated celestial sphere about the aviation trainer at the same rate that the real celestial sphere apparently rotates about a given point upon the earth's surface. Another object of such a trainer is to provide means for modifying such a rotation according to the assumed rate of change in the longitudinal position of the trainer—for example, if it be assumed that the trainer is flying eastwardly, the speed of rotation of the simulated sphere is increased, while if the trainer were supposedly flying westwardly, the speed of rotation of the simulated celestial sphere would be decreased.

In the last-mentioned copending application of the said Edwin A. Link, there is disclosed a constant speed motor which rotates the simulated celestial sphere at the same rate that the real celestial sphere apparently rotates about the earth as a result of the earth's turning upon its axis. There is also there disclosed a second motor, this motor being of the variable speed reversible type for modifying the rate of rotation of the simulated celestial sphere caused by the running of the first motor according to the assumed direction of travel (east or west) as well as the assumed rate of travel of the trainer.

The first-mentioned motor rotates the simulated celestial sphere through exactly 360° 59' in twenty-four hours, and the second-mentioned motor has an output ranging from zero degrees rotation of the celestial sphere per hour to a rotation of 360° in seven hours.

Because the rate of rotation of the simulated celestial sphere is relatively slow, even when the outputs of the time drive motor and longitude drive motor are cooperating to produce a maximum rate of rotation of the celestial sphere, and because practical engineering limitations limit the range of output that the longitude drive motor may have, it will be readily realized that it is highly advantageous to have additional means whereby when desired, the simulated celestial sphere may be rapidly moved to any desired point of rotation. It is a principal object of my invention to provide such means.

It is a more specific object of my invention to provide means whereby the time and longitude drive means of such a trainer may be disconnected from said celestial sphere and auxiliary driving means having a greater output may be connected to said celestial sphere.

Furthermore, it is often times desirable to be able to turn the simulated celestial sphere by hand, e. g., when repairs, etc., are being made upon it. It is another principal object of my invention to provide means which make it possible to rotate the sphere by hand.

It is a more specific object of my invention to provide means whereby the time and longitude drive means of such a trainer may be disconnected from said celestial sphere whereupon the simulated celestial sphere may be rotated by hand.

Reference is now made to the accompanying figures which disclose the preferred embodiment of my invention:

Figure 1:
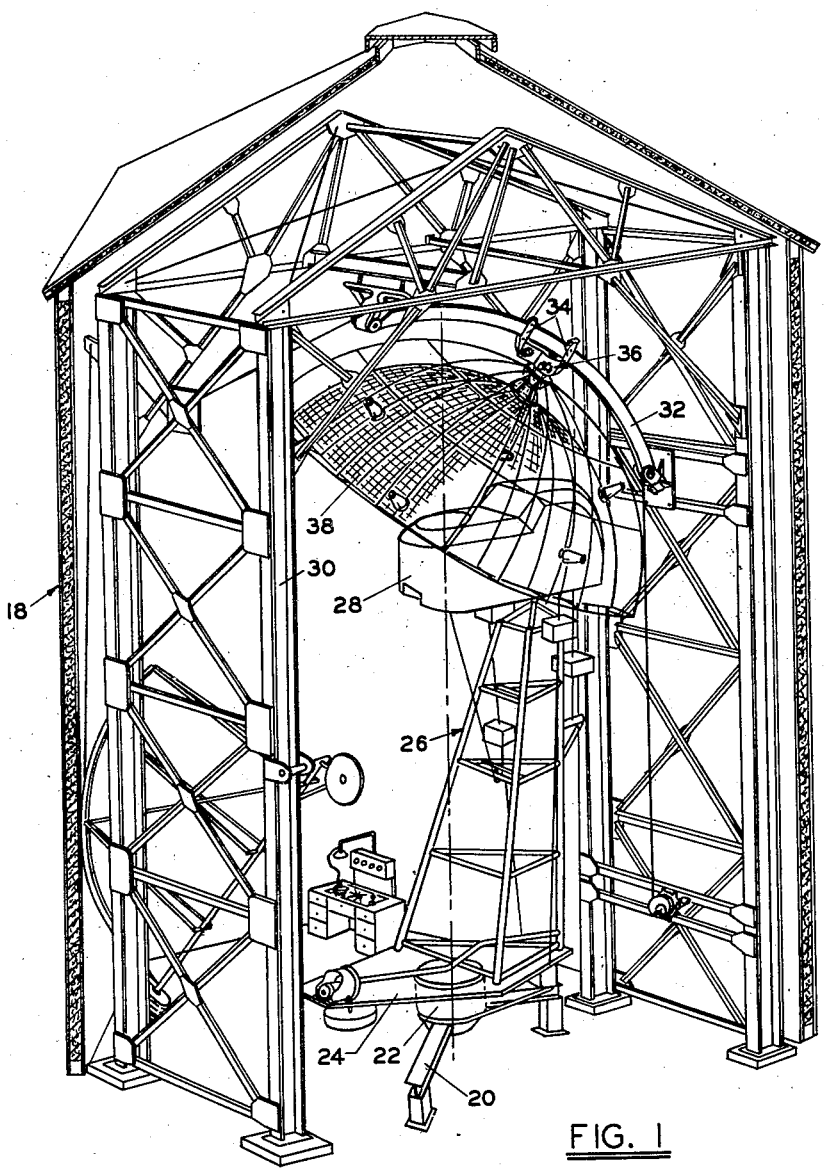
Fig. 1 is a general side view showing the base, tower, trainer, simulated celestial sphere, and framework for supporting the same, operator's desk, means for changing the position of the celestial sphere relative to the trainer, as well as the building in which the apparatus is housed.

Reference is now made to Fig. 1 which shows a building 18 which houses the complete apparatus. Inside the building is a base 20 upon which is mounted central hub 22. Upon this hub is placed platform 24 and mounted upon the platform is tower 26. At the top of the tower is positioned the fuselage 28, the interior of which simulates the interior of a real plane. This fuselage is mounted upon a universal joint (not shown) at the top of the tower 26, and a system of vacuum, bellows and valves are provided which cause the trainer fuselage to dive, climb, and bank in response to the movements of the controls within fuselage 28 in the same manner that a real plane in actual flight dives, climbs and banks in response to the movements of its controls, except that the trainer does not make any actual forward movement. Means are also provided for causing the fuselage 28 to rotate about its vertical axis in response to the movements of the rudder pedals within the fuselage. For a more detailed description of the movements of the trainer fuselage 28 reference is made to the aforementioned copending applications as well as U. S. Patents Numbers 1,825,462 and 2,099,857.

It will be seen in Fig. 1 that a steel framework 30 is provided and securely affixed thereto by suitable means is a dome rail 32. Depending lugs 34 are suitably suspended from dome rail 32 and have attached to their lower ends dome gear box designated generally by 36. The simulated celestial sphere 38 is suspended below this dome gear box by means fully described in the above-mentioned United States Patent 2,364,539.

Figure 3:
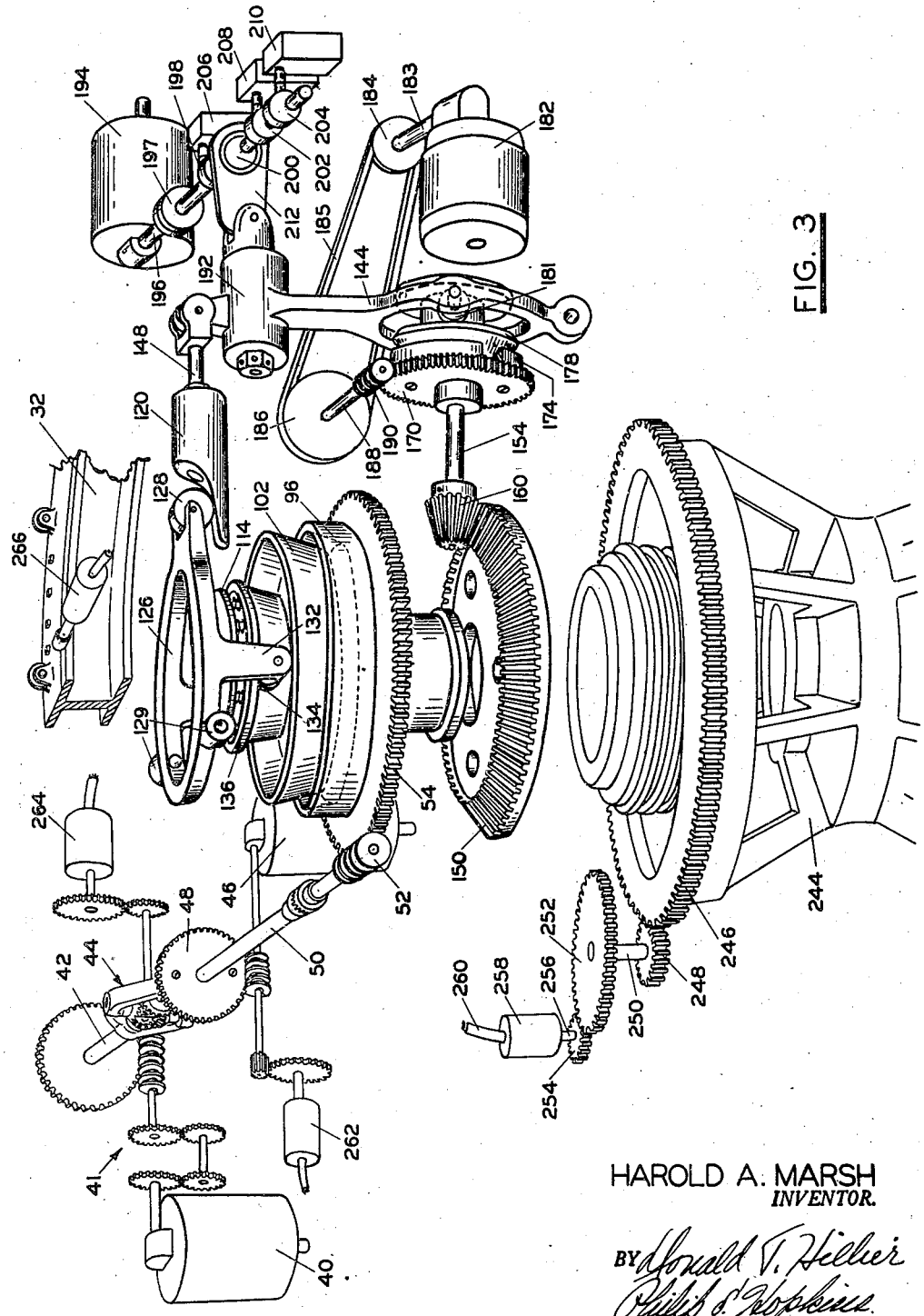
Fig. 3 is a perspective view of the inside of the dome gear box as well as the time drive motor, longitude drive motor, clutch motor, dome reset motor and the clutches which form an important part of this invention.

Reference is now made to Fig. 3 which discloses time drive motor 40 which, through a system of gears designated generally by 41, drives the input shaft 42 of differential designated generally as 44. This motor is of the constant speed, uni-directional type. Longitude drive motor 46 which is of the reversible variable speed type likewise drives the secondary 48 of this differential and the output shaft 50 of the differential drives a worm 52 which in turn drives main drive gear 54. A complete description of these motors and systems of gearings may also be found in the above-mentioned United States Patent 2,364,539.

Figure 4:
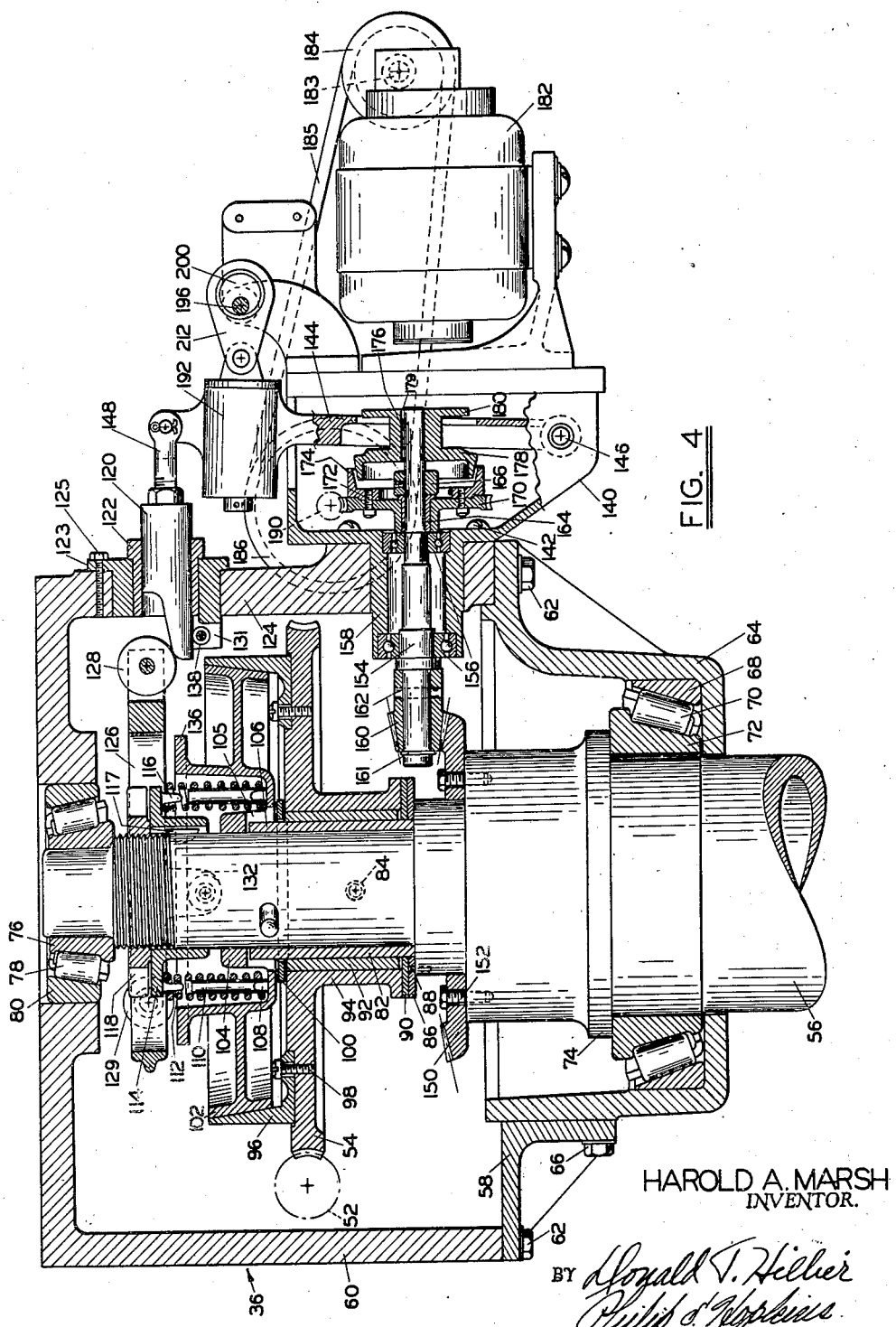
Fig. 4 is a cross sectional view of the dome gear box including the clutches and also showing in outline the clutch and dome reset motors.

Main drive gear 54 is also shown in Fig. 4 to which reference is now made. A central shaft 56 is shown in this figure and the simulated celestial sphere 38 is suitably affixed upon the lower end of this shaft in a manner to rotate therewith. This arrangement is also described in greater detail in the same copending application.

In Fig. 4 it is seen that central shaft 56 has its upper end mounted within dome gear box designated generally as 36. The bottom cover of the dome gear box 58 is attached to the main portion 60 by means of bolts 62 and has attached to its depending portion the bottom 64 of the dome gear box by means of bolts 66. The bottom 64 has mounted therewithin outer bearing race 68 which supports lower tapered bearing cage 70 and inside this cage is placed lower bearing cone 72 which is affixed to central shaft 56 for rotation therewith. A shoulder 74 of central shaft 56 rests upon cone 72. The upper end of shaft 56 has rigidly affixed thereon for rotation therewith a cone 76 and upon which in turn is mounted tapered roller bearing cage 78 which has around its outside, cup 80. It will therefore be realized that central shaft 56 is held within the dome gear box by the upward action of members 68, 70, and 72 and by the downward action of members 76, 78, and 80. It will be recalled, as seen in Fig. 1, that the dome gear box 36 is suspended from the dome rail 32 by means of lugs 34.

It should be borne in mind that the presence of bearing cages 70 and 78 make it possible for central shaft 56 to rotate within the dome gear box.

Midway between the top and bottom of the dome gear box there is mounted upon central shaft 56 steel bearing 82. Set screw 84 affixes this bearing to the central shaft for rotation therewith. Encircling this bearing and mounted upon a shoulder of the central shaft is a steel washer 86 which is also affixed to central shaft 56 for rotation therewith by means of dowel pin 88. A floating "oilite" washer 90 rests upon steel washer 86. Oilite bearing 92 is pressed into the inside of the depending portion 94 of main drive gear 54 for rotation therewith. Relative rotation is therefore possible between central shaft 56 and steel bearing 82, on the one hand, and main drive gear 54 and "oilite" bearing 92 on the other hand.

Outer clutch member 96 is attached to main drive gear 54 for rotation therewith by means of bolts 98. A floating ground washer 100 encircles central shaft 56 and steel bearing 82. Inner clutch member 102 is shown in Fig. 4 engaged with outer clutch member 96. The inner clutch member has an integral portion 104 which is fitted around central shaft 56 and this inner portion has therein two notches 105, 180° apart, each of which receives one of the upstanding lugs 106 which is integral with steel bearing 82. The notches allow inner clutch member 102 to slide up and down main shaft 56, but whenever inner clutch member 102 is rotated, steel bearing 82 and, therefore, shaft 56 must also rotate therewith.

Because of this arrangement, when main drive gear 54 is turned as a result of the output of time drive motor 40 and longitude drive motor 46, outer clutch member 96 rotates therewith, and in the event inner clutch member 102 is engaged the arrangement of notches 105 in portion 104 and upstanding lugs 106 causes central shaft 56 to rotate. In the event inner clutch member is disengaged, rotation of main drive gear 54 will merely cause that gear and "oilite" bearing 92 to rotate around steel bearing 82 and central shaft 56.

Still referring to Fig. 4, it will be seen that there is mounted in the lower inner part of inner clutch member 102 a plurality of studs 108 upon which are mounted suitable guides 110 surrounded by springs 112. A sleeve 114 is mounted upon shaft 56 above inner clutch member 102 and this collar has a plurality of studs 116 corresponding to the studs 108 of inner clutch member 102. Woodruff key 117 engages central shaft 56 and sleeve 114 so that they always rotate together. A serrated nut 118 is adapted to cooperate with the upper threaded portion of central shaft 56 so that the correct amount of compression may be placed upon springs 112, thereby making it possible to adjust the grip of clutch members 96 and 102.

Reference is now made to Figs. 3 and 4 which show a plunger 120 which is arranged to reciprocate in "oilite" bearing 122 which in turn is mounted within steel bearing 123 which is mounted within the side 124 of the dome gear box and held in place by means of screws 125. Also provided, as seen in these two figures, is a yoke 126 which has mounted for rotation therein a roller 128. Yoke 126 has two bosses 129 which fit against corresponding bosses (not shown) on the inside of the dome gear box 36, and by means of a suitable pin arrangement, yoke 126 pivots about the pins which go through these bosses. Formed integrally with yoke 126 are two depending lugs 132 only one of which is shown, however, and also mounted upon the insides of each of these depending lugs is a roller 134. Each of these rollers is adapted to engage a collar 136 of the inner clutch member 102 when the rollers 134 are moved upwardly.

Also, as seen in Fig. 4, steel bearing 123 has a U-shaped extension 131 within the dome gear box. Upon a shaft held by this extension is a roller 138, upon which the left end of plunger 120 rides.

From the foregoing arrangement, it will be understood that whenever plunger 120 is moved to the left in Figs. 3 and 4, because of the inclined shape of the inner portion of this plunger roller 128 will be elevated as will the right side of yoke 126. Inasmuch as yoke 126 will pivot about the pins through bosses 129, depending lugs 132 and rollers 134 will likewise be elevated. The engagement of rollers 134 with the collar 136 of inner clutch member 102 will cause a lifting of the inner clutch member which will therefore become disengaged from outer clutch member 96. Upon disengagement, any rotation of main drive gear 54 caused by the output of time drive motor 40 and longitude drive motor 46 will therefore not rotate central shaft 56. On the other hand, when plunger 120 be in its rightmost position, as shown in Fig. 4, roller 128 will not be elevated, neither will depending lugs 132 and rollers 134, and therefore, the compression of springs 112 causes inner clutch member 102 to engage with outer clutch member 96. When so engaged, a rotation of main drive gear 54 will cause inner clutch member 102 to rotate, and by means of notches 105 and lugs 106, bearing 82 and central shaft 56 will be rotated.

The means employed for causing plunger 120 to reciprocate thereby engaging and disengaging clutch members 96 and 102 is shown in Figs. 3 and 4. In Fig. 4, it will be seen that the reset gear housing 140 is attached to the side 124 of dome gear box 36 by means of screws 142. Yoke 144 is pivotally mounted upon a shaft 146 in the bottom of the housing 140 and the upper end of this yoke is pivotally connected to a rod 148 which is affixed to plunger 120.

Also seen in Fig. 4 is annular bevel gear 150 which is mounted upon another shoulder of central shaft 56 and affixed to this shaft for rotation therewith by means of screws 152. Shaft 154 is mounted for rotation in ball bearings 156 which in turn are mounted in an integral extension 158 of the reset gear housing 140. Upon the left end of this shaft is mounted for rotation therewith a bevel gear 160 which is positioned for engagement with annular bevel gear 150. Bevel gear 160 rotates with shaft 154 because of the presence of shear pin 162.

It will be seen in Fig. 4 that mounted near the right end of shaft 154 is an "oilite" bearing 164 and also mounted upon this same shaft to the right of this bearing is a collar 166 which is fixedly mounted upon shaft 154 by means of a set screw. Mounted upon "oilite" bearing 164 is annular worm gear 170 and attached to this gear by means of screws 172 is outer clutch member 174 of the dome reset clutch. It should be noticed that annular worm gear 170 and therefore outer clutch member 174 are free to rotate relatively with respect to shaft 154.

A Woodruff key 176 is mounted in the right end of shaft 154 and inner clutch member 178 is also mounted upon the right end of this shaft. A slot 179 is formed in inner clutch member 178 for the reception of Woodruff key 176, this arrangement making it possible for clutch member 178 to slide along shaft 154 but causing shaft 154 to rotate whenever inner clutch member 178 rotates.

It will be seen in Fig. 4 that inner clutch member 178 has a rear disc 180. As best seen in Fig. 3, upon the inside of the circular portion of the yoke 144 there are mounted two rollers 181 which fit between the front and rear disc 180 of inner clutch member 178. It will be readily realized that a movement to the left in Figs. 3 and 4 of yoke 144 will cause clutch members 174 and 178 to become engaged while a movement in the opposite direction will cause these clutch members to become disengaged.

Figure 2:
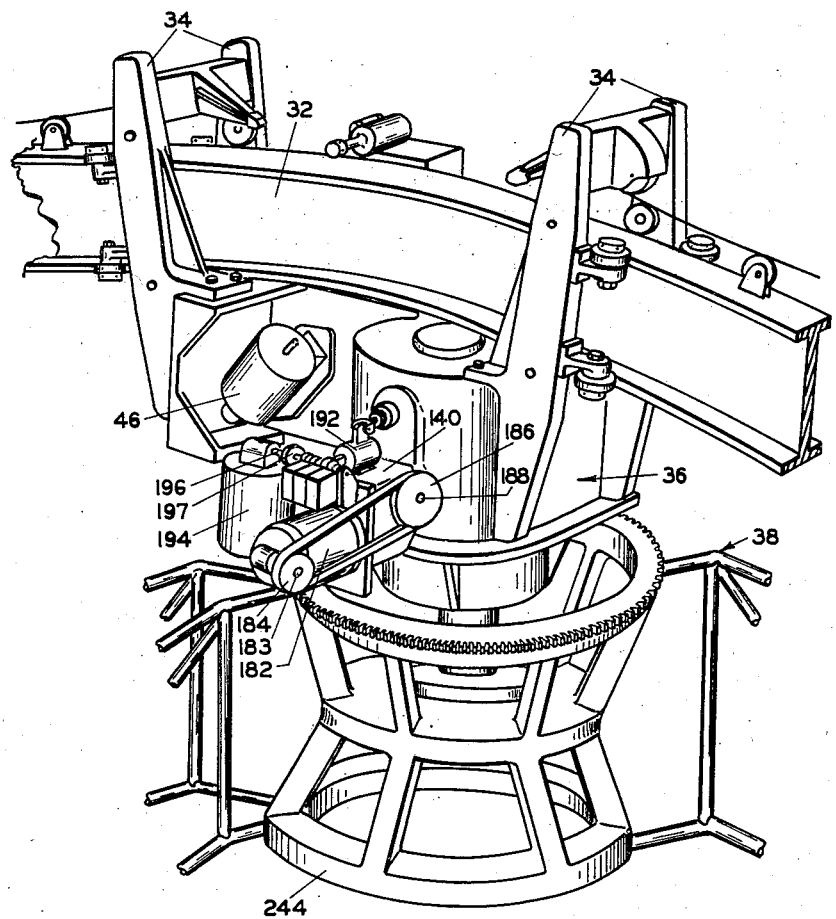
Fig. 2 is a detailed perspective view of the dome rail, dome gear box, clutch motor and dome reset motor.

Reference is now made to Fig. 3 which shows dome reset motor 182 which has mounted upon its output shaft 183 a pulley wheel 184. A second wheel 186 is outside reset gear housing 140, as seen in Fig. 2, and is fixed for rotation upon shaft 188 which is mounted within a bearing (not shown) held by the reset gear housing 140. As seen in Fig. 3, formed integrally with shaft 188 is worm 190 which is positioned to drive annular worm gear 170, which, as before explained, is affixed to outer clutch member 174.

From the foregoing it will be understood that in the event the upper portion of yoke 144 is in its rightmost position as seen in Fig. 4, clutch members 174 and 178 will be disengaged and a rotation of wheel 184 will merely cause, through the action of wheel 186, shaft 188, worm 190 and worm gear 170, a rotation of outer clutch member 174 around shaft 154. It should be noticed that the same positioning of yoke 144 which causes a disengagement of clutch members 174 and 178 causes an engagement of main clutch members 96 and 102. Such a position of yoke 144 allows the time and longitude drive motors to rotate the celestial sphere, but dome reset motor would be unable to do this. However, if the upper portion of yoke 144 be in its leftmost position, as seen in Fig. 3, clutch members 174 and 178 will become engaged and a rotation of the output wheel 184 of dome reset motor 182 will cause clutch member 178 to rotate and because of the presence of Woodruff key 176, shaft 154 and bevel gear 160 will rotate, thereby causing a rotation of central shaft 56 through the action of annular bevel gear 150. The simulated celestial sphere being mounted on shaft 56 for rotation therewith will of course also be turned.

In Fig. 3, it will be seen that integral with the hub 244 of simulated celestial sphere 38 is annular gear 246 which cooperates with pinion 248 which is mounted upon one end of a shaft 250 which has another gear 252 fixedly mounted upon its other end. This last-mentioned gear meshes with pinion 254 which is integral with the input shaft 256 of teletorque transmitter 258. This transmitter is connected electrically by means of cable 260 to a teletorque receiver (not shown) in such a manner that the central shaft of the receiver rotates through the same number of degrees as does the input shaft 256 of the transmitter 258. Suitably geared to the central shaft of the receiver, as is fully explained in the above-mentioned United States Patent 2,364,539, are hands mounted to move across a dial whenever the central shaft of the receiver is turned by the transmitter 258. It is therefore possible for the operator at all times to determine the rotatable position of the central hub 244 and celestial sphere 38.

The functions of longitude transmitter 262, time transmitter 264 and latitude transmitter 266 are also described in detail in the same copending application.

Means will now be described for governing the reciprocating motion of the housing 192 which is integral with the upper portion of yoke 144.

Figure 5:
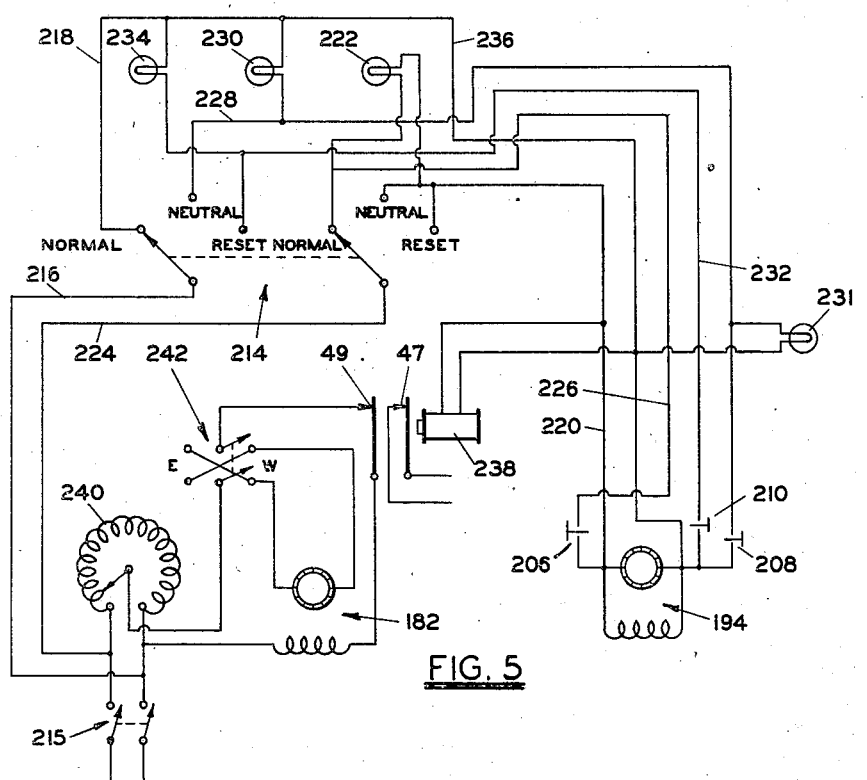
Fig. 5 is a wiring diagram of the clutch motor and its controls as well as of the reset motor and its controls.

Reference is again made to Figs. 3 and 4 which show the clutch motor 194 which, as seen in Fig. 2, is mounted near the side of the dome gear box 36. This motor is of the constant speed unidirectional type and its output shaft 196 has a coupling member 197. Eccentrically mounted upon shaft 196 for rotation therewith is a plurality of cams 198, 200, 202, and 204. Eccentrically mounted cam 198 is arranged to close microswitch 206 when it reaches a certain position of rotation. The same is true of cam 202 and micro-switch 208 and of cam 204 and micro-switch 210. As seen in Fig. 5, micro-switch 206 is the normal micro-switch; 208 is the neutral switch, and 210 is the reset micro-switch. As seen in Figs. 3 and 4, eccentric cam 200 does not operate a micro-switch, but as it is rotated upon shaft 196 it causes connecting member 212 to reciprocate which in turn causes housing 192 of yoke 144 to respond accordingly. This reciprocation of yoke 144 causes the clutch mounted upon central shaft 56 and the clutch mounted upon shaft 154 to become engaged or disengaged depending upon the direction of movement of the yoke, as explained above.

Figure 6:
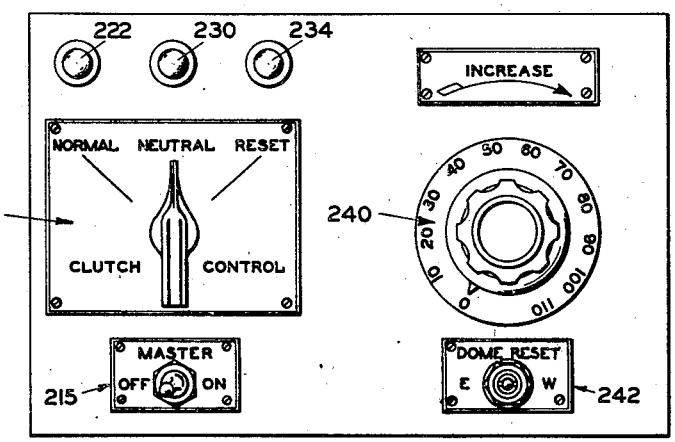
Fig. 6 shows the dome control panel.

Reference is now made to Fig. 5 which shows the electrical system necessary to operate the motors of this invention as well as Fig. 6 which shows a suitable control panel. In these two figures the clutch control switch is designated generally by the number 214 and, as seen in these figures, there are three possible positions which this switch may occupy, namely, "normal," "neutral," and "reset." The "normal" position is used when a "problem" is being "run," that is, when the simulated celestial sphere 38 is being turned by time drive motor 40 and longitude drive motor 46. In this case, it will be recalled, worm 52 turns main drive gear 54 and the clutch members 96 and 102 should be engaged. Clutch members 174 and 178 should, during this time, be disengaged.

By referring to Fig. 5, it will be seen that master switch 215 controls all the electrical parts and that clutch control switch 214 is in reality a gang switch which, when placed upon the "normal" position as shown in that figure, causes current to come in along conductor 216 to the left normal terminal along conductor 218, through the coils of clutch motor 194, up conductor 220, through normal indicator lamp 222, to the right normal terminal and back to the generator by means of conductor 224. If the clutch members 96 and 102 are engaged, eccentric cam 198 which controls micro-switch 206 will be positioned so that this switch will be open, and, inasmuch as normal indicator lamp 222 is of the high resistance type nearly all the source voltage will appear across lamp 222 and, therefore, clutch motor 194 will not run. Indicator lamp 222 will therefore be lighted and the operator will know that the clutches are in their "normal" position, that is, the clutch mounted upon central shaft 56 is engaged and the clutch mounted upon shaft 154 is disengaged.

In the event the clutches were not in the "normal" position they would have to be in either "neutral" or "reset," each of which positions will later be described in detail. If the operator desires to place them in "normal" position in order that a "problem" may be "run," he will place clutch control switch 214 in the "normal" position and the above outlined circuit will be established. However, inasmuch as the mechanism is not in the "normal" position, normal micro-switch 206 will be closed and the current traveling along conductor 218 through clutch motor 194 will not travel along conductor 220 through the high resistance indicator lamp 222 but instead will go through the closed micro-switch 206 along conductor 226 and out to the right normal terminal and conductor 224. Indicator lamp 222 will not be lighted. The clutch motor will therefore run until eccentric cam 200 reaches such a position that the main clutch mounted upon central shaft 56 is engaged and the clutch mounted upon shaft 154 is disengaged—which positions, as outlined above, are known as the "normal" position. At the instant the "normal" position of the clutches is reached, cam 198 will be so positioned that micro-switch 206 is opened and the clutch motor will therefore be stopped because current no longer can flow along conductor 226 but instead is forced to travel along conductor 220 through high resistance indicator lamp 222. However, the opening of micro-switch 206 causes normal indicator lamp to light and the operator then knows that the clutches are in the "normal" position, and that the celestial sphere may be turned by the time and longitude drive motors.

The second positions of the two clutches is referred to as the "neutral" position and denotes the fact that both of the clutches are disengaged. It is advantageous to have such an arrangement because, as stated above, it is then possible to rotate simulated celestial sphere 38 by hand as is often desirable when adjustments and repairs are being made upon certain parts of the training device. In the event the clutches are in the "normal" position and it is desired by the operator to place them in the "neutral" position, he will place clutch control switch 214 in the "neutral" position. By referring to Fig. 5, it will be understood that when this step has been taken current flowing along conductor 216 will be carried to the left neutral terminal and along conductor 228 to neutral micro-switch 208. Inasmuch as the clutches are not in the "neutral" position, cam 202 which controls neutral micro-switch 208 will be so positioned that this micro-switch is closed. Current will therefore flow through clutch motor 194 along conductor 220 and to the right neutral terminal of switch 214 and by means of conductor 224 back to the generator. The clutch motor 194 will therefore run and high resistance neutral indicator lamp 230 will not be lighted because it is shorted by switch 208. Micro-switch 208 will remain closed and, therefore, clutch motor will run and neutral indicator lamp 230 will remain unlighted until eccentric cam 200 reaches such a position that the clutch mounted upon central shaft 56 as well as the clutch mounted upon shaft 154 are both disengaged. When this condition is present, eccentric cam 202 will have reached such a position that it will cause micro-switch 208 to open, clutch motor 194 will therefore stop and "neutral" position indicator 230 will be energized. The operator then knows that the clutches are in the "neutral" position, that is, both disengaged, and that therefore the simulated celestial sphere 38 may be turned by hand without endangering any of the mechanism of the invention. At the same time neutral indicator 230 becomes lighted, indicator 231 also is lighted. This indicator is placed on the inside of the building 18 in which the trainer is housed at a point visible to one working on the celestial sphere. This provision informs such a worker that the sphere may be rotated by hand, making it unnecessary for him to check whether neutral indicator 230 in the control panel in the operator's desk is lighted.

It should also be noticed that when the apparatus is so positioned neither the time and longitude drive motors nor the dome reset motor can turn the simulated celestial sphere 38.

The third position that the clutches may occupy is known as "reset," which denotes that the clutch members 96 and 102 which are mounted upon central shaft 56 are disengaged and that the clutch members 174 and 178 which are mounted upon shaft 154 are engaged. When these parts are thus positioned, dome reset motor may be used to rotate the celestial sphere but the time and longitude drive cannot do so. If the operator desires to place the clutches in the "reset" position by turning clutch control switch 214 to the position "reset" as seen in Fig. 6, reference to Fig. 5 will show that current being led along conductor 216 will pass to the left "reset" position and along conductor 232 to reset microswitch 210. Inasmuch as the clutches are not in the "reset" position, eccentric cam 204 will be so positioned that micro-switch 210 is closed. Current will therefore flow through clutch motor 194 along conductor 220 to the right reset terminal in Fig. 5 and back to the generator by means of conductor 224. Inasmuch as reset indicator lamp 234 is shorted by closed switch 210 reset lamp 234 will not become lighted. The running of clutch motor 194 will cause the eccentric cams mounted upon its output shaft 196 to rotate and when cam 200 reaches such a position that the housing 192 in the upper part of yoke 144 is in its leftmost position, plunger 120 will be in its leftmost position and clutch members 96 and 102 will become disengaged. At the same time, clutch member 178 will be in its leftmost position and will be engaged with outer clutch member 174. When cam 200 has reached such a position, eccentric cam 204 will be so positioned that it will cause reset micro-switch 210 to open. Current will then flow through "reset" position indicator 234 along conductor 236 to clutch motor 194 and by means of conductor 220 to the right reset terminal in Fig. 5 and by means of conductor 224 back to the generator. Inasmuch as nearly all the line voltage appears across the high resistance reset indicator lamp, this lamp will become lighted but the clutch motor will not run. The operator then knows that the clutches are in the "reset" position and, therefore, that it is safe for him to run the dome reset motor 182.

Reference is made to Fig. 5 which shows the electrical control circuit of the dome reset motor and to Fig. 6 which shows the controls governing the circuit. From these two figures it will be seen that the dome reset motor circuit includes the motor as well as the variac 240, a direction control switch 242 and the clutch relay 238. By properly positioning the reset variac this voltage may be placed across the reset motor 182 and, therefore, its speed controlled. Also, by positioning reset direction control switch 242 in the position designated E the output of the motor will be in one direction while if the control be placed in the W position the direction of output of the reset motor will be reversed. This arrangement makes it possible to rotate the simulated celestial sphere in either direction. In the event direction control switch 242 be in the "neutral" position as shown in Figs. 5 and 6 the reset motor cannot run. Therefore, when the operator sees reset indicator 234 become lighted by placing direction control switch 242 from its central position to either side he can control the direction of rotation of the simulated celestial sphere 38 and by positioning reset variac 240 he may control the speed of rotation of the sphere.

In the event the output shaft 154 is rotated by dome reset motor 182 and if for any reason clutch members 96 and 102 are not completely disengaged, or if for any other reason central shaft 56 and the simulated celestial sphere do not easily turn, pin 162 will become sheared and shaft 154 will easily rotate within bevel gear 160. Damage to the mechanism is thereby prevented. In the event this happens, retaining spring 161 prevents bevel gear 160 from sliding off the end of shaft 154 in the event reset gear housing 140 is removed from the side of the dome gear box.

Reference to Fig. 5 will show that whenever sufficient voltage appears across clutch motor 194 to run the same, clutch relay 238 will be energized, thereby breaking the circuit of the longitude drive motor 46 at the contact 47 in Fig. 5 and the circuit of the dome reset motor 182 at the contact 49. This safety precaution prevents any turning of the two drive shafts 50 and 154 when the clutches are being engaged or disengaged. However, as soon as sufficient voltage to run clutch motor 194 does not appear thereacross, the clutch relay will become deenergized and the longitude drive motor and dome reset motor circuits are reestablished.

From the preceding description it will be noticed that there are provided by this invention two clutches, one of which is mounted upon the main drive shaft of the simulated celestial sphere and the other being mounted upon a secondary or auxiliary drive shaft for rotating the celestial sphere. Three possible combinations of positions of these two clutches are possible: First, the members of the main clutch may be engaged while the members of the second clutch are disengaged. This position, which is used when it is desired to rotate the simulated celestial sphere by the outputs of the time and longitude drive motors as when a "problem" is being "run," may be accomplished by the operator by placing the clutch control switch in the "normal" position.

The second of these combinations is the disengagement of the members of both clutches and this position, which is used when it is desired to rotate the simulated celestial sphere by hand, may be achieved by placing the clutch control switch in the position referred to as "neutral."

The third of these combinations of positions is known as "reset" and designates the disengagement of the main clutch members and the engagement of the auxiliary clutch members. This position is used when it is desired to rotate the simulated celestial sphere at the rapid rate which is possible by the use of the dome reset motor.

The foregoing being but a preferred embodiment of my invention, many changes may be made in the construction without departing from the spirit thereof. Consequently, I do not limit myself except by the following claims:

1. In a device for teaching celestial navigation the combination of means simulating a portion of the celestial sphere, time drive means comprising a motor and longitude drive means comprising a motor differentially arranged to rotate said sphere simulating means at the same rate as the apparent rotation of the real celestial sphere about an observer upon the earth's surface, additional driving means comprising a motor arranged to rotate said sphere simulating means at a rate relatively rapid with respect to said first-mentioned driving means, and electrical switching means under the control of an operator whereby said operator may rotate said sphere simulating means by either of said driving means.

2. In a device for teaching celestial navigation the combination of means simulating a portion of the celestial sphere, longitude drive means comprising a clutch for rotating said sphere simulating means at a relatively slow rate, a reset means comprising a clutch for rotating said sphere simulating means at a relatively rapid rate, clutch control means for engaging and disengaging said clutches, and means for preventing said longitude drive means and said reset means from operating while said clutch control means is operating.

3. In a device for teaching celestial navigation the combination of means simulating a portion of the celestial sphere, driving means comprising a clutch for rotating said sphere simulating means, reset driving means comprising a second clutch for rotating said sphere simulating means at a rate relatively rapid with respect to said first-mentioned driving means, means comprising a motor and a selector switch under the control of an operator whereby said operator may disengage said first-mentioned clutch and engage said second-mentioned clutch, whereupon said reset driving means may be used to rotate said sphere simulating means, and mechanical fusing means for automatically disengaging said reset driving means whenever said sphere simulating means is rotated by means other than said reset means simultaneously with an engagement of said reset means.

4. In a device for teaching celestial navigation the combination of means simulating a portion of the celestial sphere; a first driving means comprising a motor for rotating said sphere simulating means about an axis; a second driving means comprising a motor for rotating said sphere simulating means about the same axis at a rate substantially faster than said first driving means; a third means comprising a motor for operatively connecting either of said driving means to rotate said sphere simulating means; and electrical switching means under the control of an operator for selectively energizing any of said motors.

5. In a device for teaching celestial navigation the combination of means simulating a portion of the celestial sphere; a first driving means for rotating said sphere simulating means about an axis; a second driving means for rotating said sphere simulatling means about the same axis at a substantially faster rate; and means for selectively operatively connecting and disconnecting said two driving means with respect to said sphere simulating means, said means comprising a motor, means for energizing said motor, three circuit changing elements, one of said circuit changing elements stopping said motor when said first driving means is operatively connected to drive said sphere simulating means, another of said circuit changing elements stopping said motor when said second driving means is operatively connected to drive said sphere simulating means, and the third circuit changing element stopping said motor when neither of said driving means is operatively connected to drive said sphere simulating means, and a selector switch under the control of an operator for selectively rendering effective any one of said circuit changing means.

6. In a device for teaching celestial navigation the combination of means simulating a portion of the celestial sphere, driving means comprising a clutch for rotating said sphere simulating means, reset driving means comprising a second clutch for rotating said sphere simulating means, a motor, a member movable by said motor and connected to one of the parts of each of said clutches for engaging and disengaging said clutches, a selector switch, and circuit means for starting and stopping said motor according to the positions of said selector switch and said clutches.

7. In a device for teaching celestial navigation the combination of means simulating a portion of the celestial sphere; a first driving means comprising a clutch for rotating said sphere simulating means about an axis; a second driving means comprising a second clutch for rotating the sphere simulating means about the same axis at a substantially faster rate; and means for selectively engaging and disengaging said clutches, said means comprising a motor, two circuit changing elements and a selector switch, one of said circuit changing elements stopping said motor when said selector switch is in a given position and said first clutch is engaged and said second clutch is disengaged, and the other of said circuit changing elements stopping said motor when said selector switch is in a different position and said first clutch is disengaged and said second clutch is engaged.

HAROLD A. MARSH.

REFERENCES CITED

The following references are of record in the file of this patent:

UNITED STATES PATENTS

| Number | Name | Date |
|---|---|---|
| 1,079,358 | Noyes | Nov. 25, 1913 |
| 1,831,939 | White | Nov. 17, 1931 |
| 1,706,550 | Stader | Mar. 26, 1929 |
| 1,959,601 | Schulse | May 22, 1934 |
| 29,229 | Agnew | July 24, 1860 |
| 307,636 | Ferguson | Nov. 4, 1884 |
| 336,280 | Bailey | Feb. 16, 1886 |
| 1,019,405 | Atwood | Mar. 5, 1912 |
| 1,952,024 | Russert | Mar. 20, 1934 |